UNITED STATES PATENT OFFICE.

KARL GEISER AND ALBERT SCHATZMANN, OF BERNE, SWITZERLAND.

PRINTING-PLATE.

No. 894,265.　　　　Specification of Letters Patent.　　　Patented July 28, 1908.

Application filed April 18, 1907. Serial No. 368,986.

*To all whom it may concern:*

Be it known that we, KARL GEISER and ALBERT SCHATZMANN, citizens of the Confederation of Switzerland, residing at Berne, in the Canton of Berne and Confederation of Switzerland, have invented certain new and useful Improvements in Printing-Plates, of which the following is a specification, reference being had to the accompanying drawings.

Our invention relates to improvements in the tone plates used in the printing of books and the like; and the object of our invention is to provide a printing plate of superior material to that heretofore used.

The composition of the plate consists of a mixture of chlorid of magnesium and magnesite with starch and talc. As compared with the printing plates now in use and made of sawdust and a mixture of chlorid of magnesium and magnesite (this mixture being known as Sorel cement), our new composition affords the advantage that the plates can be made with a perfectly smooth surface that can be readily and, therefore, very neatly worked, in such manner that neither during the working of the surface nor later during the use thereof will small pieces of the prepared surface become loose. The composition is, therefore, peculiarly adapted for a planographic printing surface; but it may be used for a relief printing surface and for an intaglio printing surface as well. In the ordinary preparation of the composition, one takes equal parts of magnesite, starch and talc and stirs them into a solution of magnesium chlorid until the mixture attains a consistency of oil color. Any desired degree of hardness may be obtained by varying the proportions of the three basic ingredients, magnesite, starch and talc. The preparation or manufacture of the composition then is completed by casting the mixture in suitable molds.

As compared with the printing plates heretofore used (for example, a plate having a wooden base upon which is glued a layer of celluloid), our new printing plate is made up of a homogeneous body or mass without a base of wood or of metal. A shifting of the topmost layer, the layer which carries the working face, is avoided; and, further, the loosening of small pieces during the use of the plate is obviated. Again, one overcomes the difficulties inherent upon the process of pasting or soldering upon the metal or wooden base the layer which is to be prepared.

We claim:

1. A composition for printing plates made up of a mixture of magnesite, starch and talc with a solution of magnesium chlorid.

2. A printing plate made up by casting in suitable molds a mixture of magnesite, starch and talc with a solution of magnesium chlorid.

Signed at said Berne in the presence of the two undersigned witnesses this 8th day of April, A. D. 1907.

KARL GEISER,
　　　　ALBERT SCHATZMANN.

Witnesses:
　FRIEDRICH NAEGELI,
　FRIEDRICH MONING.